(12) United States Patent
Tay (10) Patent No.: US 8,284,756 B2
(45) Date of Patent: Oct. 9, 2012

(54) DMR PRIVATE NETWORK COMMUNICATION TERMINAL, COMMUNICATION SYSTEM, AND IMPLEMENTATION METHOD THEREOF

(75) Inventor: Wanfook Tay, Shenzhen (CN)

(73) Assignee: Hytera Communications Corp., Ltd., Shenzhen (CN)

( * ) Notice: Subject to any disclaimer, the term of this patent is extended or adjusted under 35 U.S.C. 154(b) by 278 days.

(21) Appl. No.: 12/672,670

(22) PCT Filed: Sep. 28, 2008

(86) PCT No.: PCT/CN2008/072596
§ 371 (c)(1),
(2), (4) Date: Feb. 8, 2010

(87) PCT Pub. No.: WO2010/034163
PCT Pub. Date: Apr. 1, 2010

(65) Prior Publication Data
US 2011/0026514 A1    Feb. 3, 2011

(51) Int. Cl.
*H04W 4/00* (2009.01)
*H04B 7/212* (2006.01)
*H04J 3/06* (2006.01)

(52) U.S. Cl. ........ 370/350; 370/314; 370/328; 370/329; 370/347

(58) Field of Classification Search ................. None
See application file for complete search history.

(56) References Cited

U.S. PATENT DOCUMENTS

| 5,396,496 A * | 3/1995 | Ito et al. ................ 370/314 |
| 5,748,621 A | 5/1998 | Masuda et al. |
| 2009/0219916 A1* | 9/2009 | Bohn ....................... 370/347 |

FOREIGN PATENT DOCUMENTS

| CN | 1136752 A | 11/1996 |
| CN | 101197590 A | 6/2008 |
| EP | 0486692 A1 | 5/1992 |

OTHER PUBLICATIONS

ETSI TS 102 361-1 V1.4.5 (Dec. 2007). pp. 15-20.

* cited by examiner

*Primary Examiner* — Faruk Hamza
*Assistant Examiner* — Diane Lo
(74) *Attorney, Agent, or Firm* — Harness, Dickey & Pierce, P.L.C.

(57) ABSTRACT

The present invention relates to private network communication techniques, and provides a DMR private network communication terminal, communication system, and an implementation method thereof. The DMR private network communication terminal includes: a communication module, adapted to receive/transmit DMR private network communication; a synchronization module, adapted to listen to a DMR synchronization pattern and establish synchronization with the DMR synchronization pattern, determine the time slot occupied by the DMR synchronization pattern, and thereby lock the pre-assigned communication time slot, and controls the communication module to receive/transmit DMR private network communication in the pre-assigned time slot.

10 Claims, 5 Drawing Sheets

DMR PRIVATE NETWORK COMMUNICATION TERMINAL, COMMUNICATION SYSTEM, AND IMPLEMENTATION METHOD THEREOF

FIELD OF THE INVENTION

The present invention relates to private network communication techniques, in particular to a DMR private network communication terminal, a communication system, and an implementation method thereof.

BACKGROUND OF THE INVENTION

Digital Mobile Radio (DMR) standard is an European private network communication standard recently issued by European Telecommunications Standards Institute (ETSI) for taking place of the analog Private Mobile Radio (PMR) standard, which is advantageous in large coverage area, high transmission rate, high frequency spectrum efficiency, and good power saving effect. Therefore, mobile communication products based on DMR standard are highly favored in the market.

Figure 1:
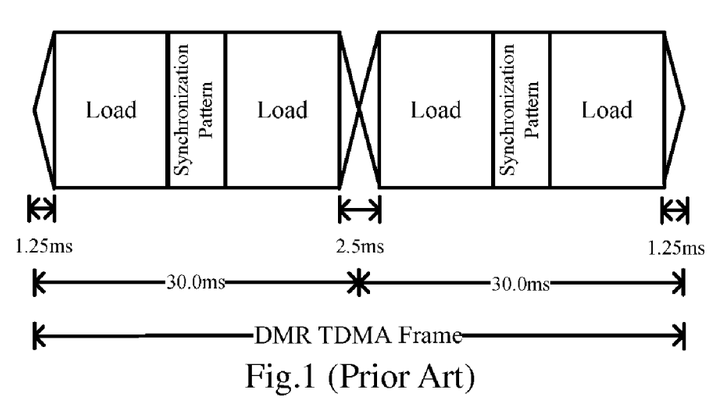
FIG. 1 is a schematic structural diagram of DMR TDMA frame in direct mode.

The DMR standard employs Time Division Multiple Access (TDMA) frame structure with double time slot. FIG. 1 is a schematic structural diagram of DMR TDMA frame in direct mode. The direct mode means that communication terminals communicate with each other directly without via a relay station therebetween. As shown in FIG. 1, a DMR TDMA frame includes two completely identical time slots, each of the time slots is 30 ms in length and is further divided by a middle synchronization pattern field in a length of 5 ms into two loads with the same length (11.25 ms bits). Each of the time slots is provided with a protective interval in a length of 1.25 ms at two ends thereof respectively. Therefore, the protective interval between the two time slots is 2.5 ms.

Figure 2:
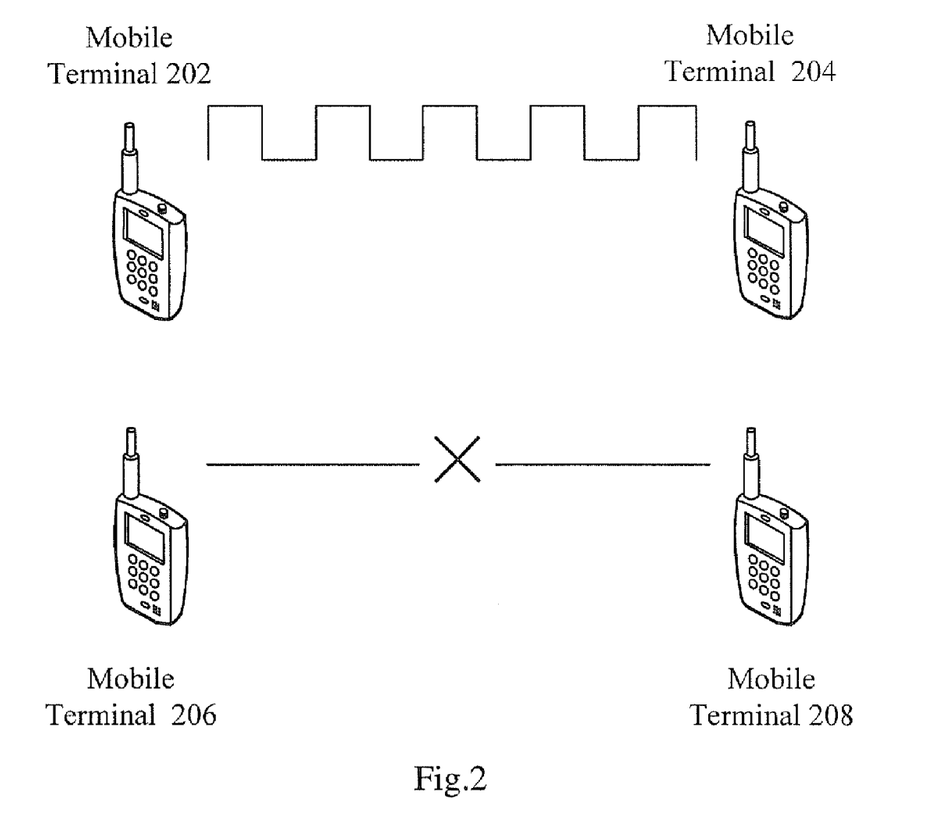
FIG. 2 is a schematic diagram of the application environment for existing private network communication terminals based on DMR standard.

However, the DMR standard does not further define how to use two time slots in the frames to support two independent channels of private network communication in direct mode; therefore, the existing private network communication terminals based on the DMR standard still use one time slot in the frames for private network communication. FIG. 2 is a schematic diagram of an application environment 200 for existing private network communication terminals based on the DMR standard. As shown in FIG. 2, there are a plurality of private network communication terminals 202~208 in the application environment 200. Wherein, the private network communication terminal 202 is communicating with the private network communication terminal 204. Though the private network communication between the private network communication terminal 202 and the private network communication terminal 204 only occupies one time slot in a DMR TDMA frame, the private network communication terminal 206 and the private network communication terminal 208 in the same geographic region still cannot use the other time slot to perform private network communication.

The cause for the above problem lies in: though the private network communication between the private network communication terminal 202 and the private network communication terminal 204 only occupies one time slot, the position of the occupied time slot is not fixed (i.e., the time slot occupied by the same channel of private network communication may vary at different times; for example, time slot 1 is used to initiate the private network communication, time slot 2 or time slot 1 may be used for a response in different response stages); therefore, other private network communication terminals in the same geographic region can not determine in advance which time slot is not occupied, and consequently can not initiate a new private network communication.

Hence, a technical solution is required to overcome the drawback existing in the prior art.

SUMMARY OF THE INVENTION

To solve the technical problem in the prior art, i.e., the position of time slot occupied by the same channel of private network communication at different times is not fixed, and therefore the idle time slot can not be determined in advance, and can not be used to initiate new private network communication, the present invention provides a DMR private network communication terminal, a DMR private network communication system, and an implementation method thereof.

The technical solution provided in the present invention to solve the technical problem is as follows:

A DMR private network communication terminal, adapted to implement DMR private network communication in direct mode, including:

a communication module, adapted to receive a DMR synchronization pattern, and to receive and transmit DMR private network communication;

the DMR private network communication terminal further includes:

a synchronization module, adapted to:

establish synchronization with the received DMR synchronization pattern, determine the time slot which is occupied by the DMR private network communication according to the DMR synchronization pattern, and thereby lock a pre-assigned communication time slot;

control the communication module to receive and transmit DMR private network communication in the pre-assigned communication time slot.

In the DMR private network communication terminal provided in the present invention, the synchronization module stores a mapping relationship between each DMR synchronization pattern and time slot Identification.

In the DMR private network communication terminal provided in the present invention, when DMR private network communication are received/transmitted in the pre-assigned communication time slot, the synchronization module inserts the synchronization pattern corresponding to the pre-assigned communication time slot into the time slot.

In the DMR private network communication terminal provided in the present invention, when DMR private network communication is initiated, if no DMR synchronization pattern is received, the synchronization module controls the communication module to initiate DMR private network communication directly, and inserts the synchronization pattern corresponding to the pre-assigned communication time slot into the time slot occupied by the DMR private network communication.

The present invention further provides a DMR private network communication system, which at least includes:

a first DMR private network communication terminal;

a second DMR private network communication terminal;

in which, the first DMR private network communication terminal and the second DMR private network communication terminal are pre-assigned with the same communication time slot;

both the first DMR private network communication terminal and the second DMR private network communication terminal listen to a DMR synchronization pattern to establish synchronization with the DMR synchronization pattern, determine the time slot which is occupied by the DMR private network communication according to the DMR synchronization pattern, and thereby lock a pre-assigned communication time slot;

the first DMR private network communication terminal and the second DMR private network communication terminal perform DMR private network communication in the pre-assigned communication time slot.

The DMR private network communication system provided in the present invention at least further includes:

a third DMR private network communication terminal;

a fourth DMR private network communication terminal;

the third DMR private network communication terminal and the fourth DMR private network communication terminal are pre-assigned with the same communication time slot, which is different from the communication time slot pre-assigned to the first DMR private network communication terminal and the second DMR private network communication terminal;

both the third DMR private network communication terminal and the fourth DMR private network communication terminal listen to a DMR synchronization pattern to establish synchronization with the DMR synchronization pattern, determine the time slot which is occupied by the DMR private network communication according to the DMR synchronization pattern, and thereby lock the pre-assigned communication time slot;

the third DMR private network communication terminal and the fourth DMR private network communication terminal perform DMR private network communication in the pre-assigned communication time slot.

The present invention further provides an implementation method for DMR private network communication, adapted to implement DMR private network communication in direct mode, including: listening to a DMR synchronization pattern so as to establish synchronization with the DMR synchronization pattern, determining the time slot which is occupied by the DMR private network communication, and thereby locking the pre-assigned communication time slot, and receiving/transmitting DMR private network communication in the pre-assigned communication time slot.

In the implementation method for DMR private network communication provided in the present invention, performing DMR private network communication in the pre-assigned communication time slot further includes: inserting a synchronization pattern corresponding to the pre-assigned communication time slot into the pre-assigned communication time slot.

The implementation method for DMR private network communication provided in the present invention further includes: initiating DMR private network communication directly when the DMR private network communication is initiated, if no DMR synchronization pattern is received.

In the implementation method for DMR private network communication provided in the present invention, initiating DMR private network communication directly further includes: inserting the synchronization pattern corresponding to the pre-assigned communication time slot into the time slot which is occupied by the DMR private network communication.

The technical solution of the present invention has the following beneficial effects: by pre-assigning communication time slots to private network communication terminals and defining only terminals with the same communication time slot can communicate with each other, the same channel of private network communication is assured to be transmitted in the same time slot. In doing so, other private network communication terminals can lock the unoccupied idle time slot in advance, and use the idle time slot to initiate new private network communication, and thereby the frequency spectrum resource specified in DMR protocol can be fully utilized. In addition, by pre-assigning a communication time slot to each communication terminal in advanced and defining only terminals with the same communication time slot can communicate with each other, calls in different time slots are completely independent from each other and have no influence on each other; therefore, two different time slots can be assigned to users in different groups.

DETAILED DESCRIPTION OF THE INVENTION

For a better understanding of the objects, technical solution, and advantages of the present invention, the present invention will be further detailed below in combination with the accompanying drawings and embodiments. It should be appreciated that the embodiments described here are only provided to explain the present invention, and should not limit the present invention.

As described above, each time slot in a DMR TDMA frame is divided by a middle synchronization pattern field in a length of 5 ms into two loads with the same length (11.25 ms). There are six synchronization patterns defined in DMR protocol: voice synchronization pattern sent from a Mobile Station (MS), data synchronization pattern sent from an MS, voice synchronization pattern sent from a Base Station (BS), data synchronization pattern sent from a BS, Reverse Channel synchronization pattern, and reserved synchronization pattern. In the technical solution provided in the present application, two patterns can be selected arbitrarily from the six synchronization patterns and redefined as synchronization pattern for time slot 1 and synchronization pattern for time slot 2 (i.e., the two patterns are used as Identifications for time slot 1 and time slot 2). Optionally, four patterns can be selected from the six synchronization patterns and redefined as voice synchronization pattern for time slot 1, data synchronization pattern for time slot 1, voice synchronization pattern for time slot 2, and data synchronization pattern for time slot 2, i.e., the type of the private network communication carried in each time slot (such as voice or data) is identified while identifying the time slot 1 and time slot 2.

It should be noted that in the specific implementation process, if the original function (i.e., the function defined in the DMR protocol) of any pattern in the six synchronization patterns has to be kept, other patterns in the six synchronization patterns can be redefined. Moreover, new synchronization patterns can be defined, instead of selecting from the six synchronization patterns defined in the DMR protocol.

In the technical solution provided in the present invention, the communication time slot of each DMR private network communication terminal is preset, i.e., the communication time slot of each DMR private network communication terminal is either time slot 1 or time slot 2; meanwhile, it is defined that only the DMR private network communication terminals with the same working time slot can communication with each other.

The implementation method for DMR private network communication provided according to the present invention will be described below with reference to FIG. 3.

Figure 3:
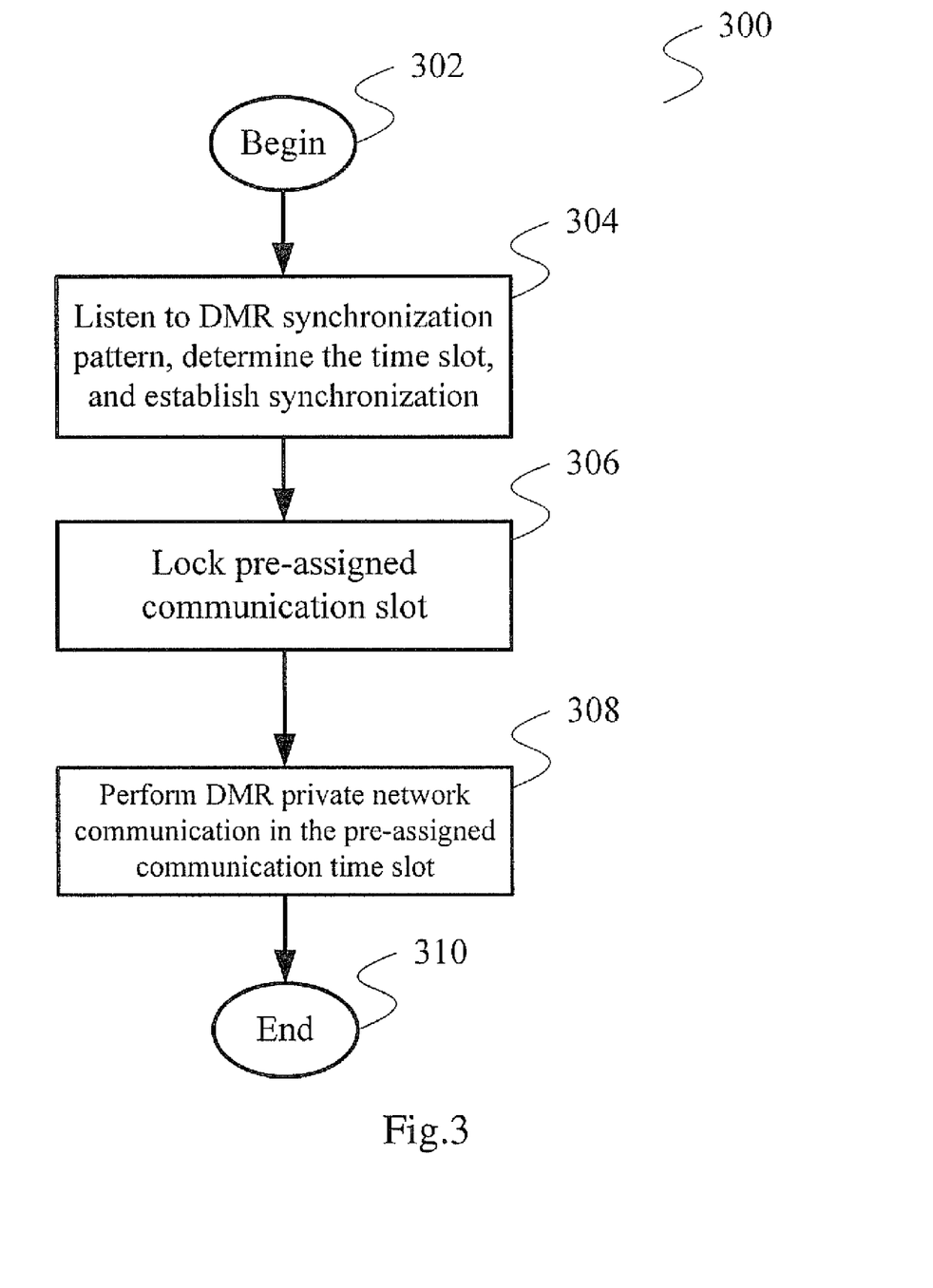
FIG. 3 is a flow chart of the implementation method for DMR private network communication according to a preferred embodiment of the present invention.

FIG. 3 is a flow chart of the implementation method 300 for DMR private network communication according to a preferred embodiment of the present invention. As shown in FIG. 3, the method 300 begins with step 302.

Then, in the next step 304, a DMR private network communication terminal listens to a DMR synchronization pattern, determines the time slot which is occupied by the DMR synchronization pattern, and establishes synchronization with the DMR synchronization pattern. In direct mode, if the DMR synchronization pattern is received, it indicates there is an active private network communication. As described above, whether the time slot which is occupied by the DMR synchronization pattern is time slot 1 or time slot 2 can be determined according to the received DMR synchronization pattern. In addition, since DMR synchronization pattern is in the middle of each time slot, synchronization with the DMR synchronization pattern can be established based on the frame structure of the DMR TDMA frames in private network mode. For example, the DMR private network communication terminal can record the time at which the DMR synchronization pattern is listened, and synchronize with each time slot based on the length of each load in the time slot and the interval between two time slots in the DMR frame.

Then, in the next step 306, the DMR private network communication terminal locks the pre-assigned communication time slot. In the present invention, each DMR private network communication terminal is preset with a communication time slot. After establishing synchronization with the DMR synchronization pattern and determining the time slot which is occupied by the received DMR synchronization pattern, the DMR private network communication terminal can lock the communication time slot preset for it. For example, if the time slot occupied by the DMR private network communication is determined to be time slot 1 according to the received DMR synchronization pattern, DMR private network communication terminals with communication time slot being time slot 1 can lock the time slot, while DMR private network communication terminals with communication time slot being time slot 2 can lock the next time slot, i.e., time slot 2.

Next, in step 308, the DMR private network communication terminal uses the locked communication time slot for DMR private network communication, and inserts a DMR synchronization pattern corresponding to its communication time slot into the locked time slot. As described above, in direct mode, if the DMR synchronization pattern is received in step 304, it indicates there is an active private network communication. Therefore, the communication time slot of the DMR private network communication terminal can be the time slot occupied by the active private network communication, or the other time slot that is unoccupied. If the communication time slot of the DMR private network communication terminal is the occupied time slot, the DMR private network communication terminal can not use the time slot for private network communication until the time slot becomes idle. If the communication time slot of a DMR private network communication terminal is the time slot that is unoccupied, the DMR private network communication terminal can start private network communication immediately. In the actual implementation process, DMR private network communication terminals can perform detections (e.g., including, but not limited to RSSI detection) for their communication time slots, to judge whether their communication time slots are idle.

Finally, method 300 ends at step 310.

The private network communication mentioned here can be initiating private network communication or responding to the received private network communication. In case of initiating private network communication, if no DMR synchronization pattern is received in step 304, it indicates there is no active private network communication. In that case, the DMR private network communication terminal can initiate DMR private network communication directly, and insert the DMR synchronization pattern corresponding to its communication time slot into the time slot that carries the DMR private network communication.

The present invention further provides a DMR private network communication system. The DMR private network communication system will be detailed below with reference to FIG. 4.

Figure 4:
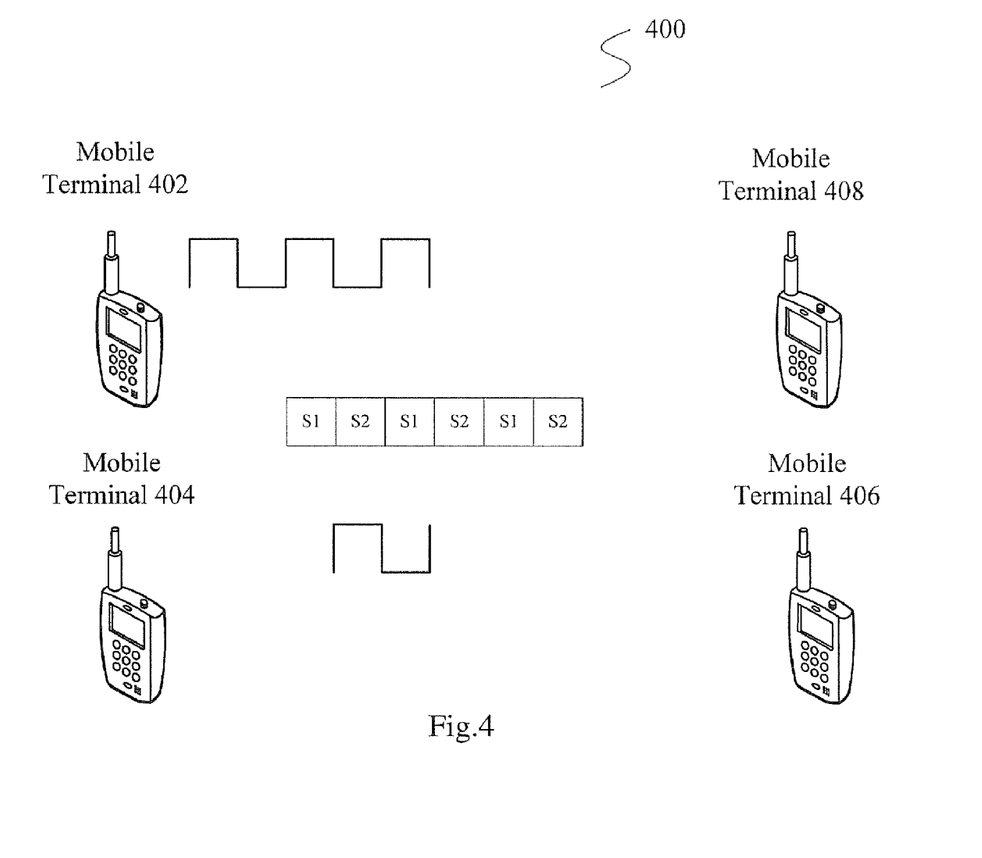
FIG. 4 is a schematic structural diagram of the DMR private network communication system according to a preferred embodiment of the present invention.

FIG. 4 is a schematic structural diagram of the DMR private network communication system 400 according to a preferred embodiment of the present invention. As shown in FIG. 4, the DMR private network communication system 400 includes a plurality of DMR private network communication terminals, such as terminals 402~408; in which, the communication time slots of terminal 402 and terminal 408 are time slot 1, while terminal 404 and the communication time slots of terminal 406 are time slot 2. Therefore, terminal 402 and terminal 408 can perform DMR private network communication with each other, and terminal 404 and terminal 406 can perform DMR private network communication with each other, but terminal 402 and terminal 408 can not communicate with terminal 404 and terminal 406.

Each of the terminals 402~408 is adapted to listen to a DMR synchronization pattern, determine the time slot which is occupied by the received DMR synchronization pattern, and establish synchronization with the DMR synchronization pattern. Then, the terminal locks the communication time slot preset for it, and uses the communication time slot for DMR private network communication.

As shown in FIG. 4, when terminal 402 and terminal 408 are using their communication time slot (i.e., time slot 1) for DMR private network communication, both terminal 404 and terminal 406 can listen to the DMR synchronization pattern in the DMR TDMA frames that bear private network communication between terminal 402 and terminal 408, and thereby establish synchronization with the DMR synchronization pattern. In addition, terminal 404 and terminal 406 can determine that the time slot occupied by the active private network communication between terminal 402 and terminal 408 is time slot 1 according to the DMR synchronization pattern. Subsequently, terminal 406 and terminal 408 lock the communication time slot (i.e., time slot 2), and perform detections (including, but not limited to RSSI detection) for the time slot, to determine whether the time slot is idle; if the time slot is idle, time slot 2 is used for DMR private network communication.

The present invention further provides a DMR private network communication terminal. The DMR private network communication terminal will be detailed below with reference to FIG. 5.

Figure 5:
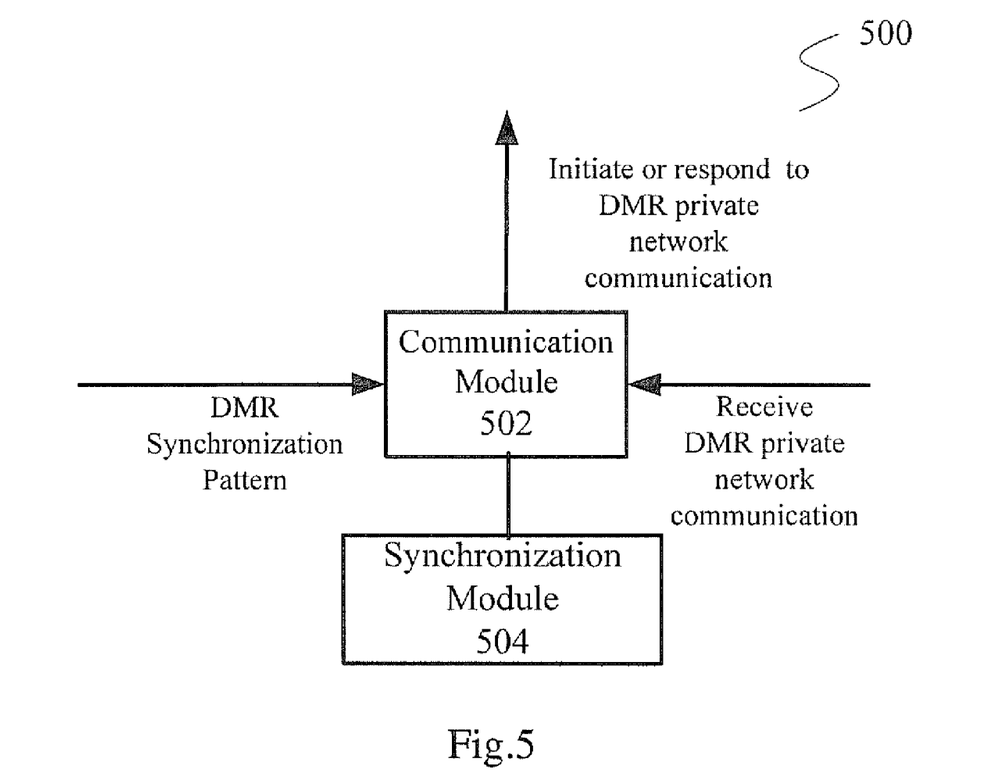
FIG. 5 is a schematic structural diagram of the DMR private network communication terminal according to a preferred embodiment of the present invention.

FIG. 5 is a schematic structural diagram of the DMR private network communication terminal 500 according to a preferred embodiment of the present invention. As shown in FIG. 5, the DMR private network communication terminal 500 includes a communication module 502 and a synchronization module 504.

The communication module 502 is adapted to receive DMR synchronization pattern and receive/transmit DMR private network communication, including receiving DMR private network communication, and initiating or responding to DMR private network communication. The contents relating to receiving DMR synchronization pattern and receiving/transmitting DMR private network communication have been described clearly in the prior art, and therefore will be omitted here.

The synchronization module 504 is used to analyze the DMR synchronization pattern received by the communication module 502, establish synchronization with the DMR synchronization pattern, and determine the time slot which is occupied by the DMR synchronization pattern, and thereby lock the pre-assigned communication time slot and control the communication module 502 to perform DMR private network communication in the communication time slot.

While the present invention has been illustrated and described with reference to some preferred embodiments, the present invention is not limited to these. Various variations, equivalent replacements, and improvements without departing from the spirit and scope of the present invention will fall within the scope of the invention.

What is claimed is:

1. A Digital Mobile Radio (DMR) private network communication terminal, adapted to implement DMR private network communication in direct mode, comprising:
   a communication module, adapted to receive a DMR synchronization pattern, and to receive and transmit DMR private network communication in a pre-assigned time slot of the DMR private network communication terminal;
   wherein, the DMR private network communication terminal further comprises:
   a synchronization module, adapted to:
   determine a time slot which is occupied by the received DMR private network communication according to the DMR synchronization pattern;
   establish synchronization with the received DMR synchronization pattern according to the time slot which is occupied by the received DMR private network communication and the pre-assigned time slot of the DMR private network communication terminal;
   lock the pre-assigned time slot of the DMR private network communication terminal; and
   control the communication module to respond to the DMR private network communication in the pre-assigned time slot of the DMR private network communication terminal.

2. The DMR private network communication terminal according to claim 1, wherein:
   the synchronization module is adapted to:
   control the communication module to initiate DMR private network communication in the pre-assigned time slot if the pre-assigned time slot is an idle time slot.

3. The DMR private network communication terminal according to claim 2, wherein, the synchronization module locks the idle time slot by means of carrier listening or RSSI detection.

4. The DMR private network communication terminal according to claim 2, wherein:
   the synchronization module is adapted to:
   control the communication module to initiate DMR private network communication directly if no DMR synchronization pattern is received.

5. A Digital Mobile Radio (DMR) private network communication system, comprising at least:
   a first DMR private network communication terminal; and
   a second DMR private network communication terminal;
   wherein, both the first DMR private network communication terminal and the second DMR private network communication terminal listen to a DMR synchronization pattern to establish synchronization according to a pre-assigned time slot of the first DMR private network communication terminal and the second DMR private network communication terminal, and thereby distinguishing each time slots;
   the first DMR private network communication terminal locks the pre-assigned time slot if the pre-assigned time slot is an idle time slot, and initiates DMR private network communication to the second DMR private network communication terminal in the pre-assigned time slot; and
   the second DMR private network communication terminal receives the DMR private network communication, determines the pre-assigned time slot which is occupied by the DMR private network communication, and responds to the DMR private network communication in the pre-assigned time slot.

6. The DMR private network communication system according to claim 5, wherein, if the DMR private network communication terminal does not receive any DMR synchronization pattern, the DMR private network communication terminal initiates DMR private network communication directly to the second DMR private network communication terminal.

7. An implementation method for Digital Mobile Radio (DMR) private network communication, adapted to implement DMR private network communication in direct mode, comprising:
   listening to, by a DMR private network communication terminal, a DMR synchronization pattern;
   determining, by the DMR private network communication terminal, a time slot which is occupied by the DMR private network communication upon receiving the DMR private network communication;
   establishing, by the DMR private network communication terminal, synchronization with the DMR synchronization pattern according to the time slot which is occupied by the received DMR private network communication and a pre-assigned time slot of the DMR private network communication terminal; and responding to the DMR private network communication in the pre-assigned time slot.

8. The implementation method for DMR private network communication according to claim 7, wherein, the method further comprises:
   locking an idle time slot, and initiating DMR private network communication in the idle time slot if DMR private network communication is to be initiated.

9. The implementation method for DMR private network communication according to claim 8, wherein, locking the idle time slot further comprises: locking the idle time slot by means of carrier listening or RSSI detection.

10. The implementation method for DMR private network communication according to claim 9, wherein, the method further comprises:

initiating DMR private network communication directly if the DMR private network communication is to be initiated in case that no DMR synchronization pattern is received.

* * * * *